(12) United States Patent
Akimoto et al.

(10) Patent No.: US 12,518,449 B2
(45) Date of Patent: Jan. 6, 2026

(54) OBJECT-TO-TEXT CONVERSION METHOD AND SYSTEM

(71) Applicant: Semiconductor Energy Laboratory Co., Ltd., Atsugi (JP)

(72) Inventors: Kengo Akimoto, Isehara (JP); Junpei Momo, Sagamihara (JP); Takahiro Fukutome, Atsugi (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/423,400

(22) Filed: Jan. 26, 2024

(65) Prior Publication Data

US 2024/0257422 A1 Aug. 1, 2024

Related U.S. Application Data

(63) Continuation of application No. 17/626,310, filed as application No. PCT/IB2020/056441 on Jul. 9, 2020, now Pat. No. 11,922,549.

(30) Foreign Application Priority Data

Jul. 19, 2019 (JP) .................................. 2019-133273

(51) Int. Cl.
*G06T 11/20* (2006.01)
*G06F 40/40* (2020.01)
(Continued)

(52) U.S. Cl.
CPC .............. *G06T 11/60* (2013.01); *G06F 40/40* (2020.01); *G06T 7/73* (2017.01); *G06T 11/206* (2013.01);
(Continued)

(58) Field of Classification Search
CPC ......... G06T 11/60; G06T 7/73; G06T 11/206; G06T 2200/24; G06T 2207/20072; G06F 40/40; G06F 40/56
See application file for complete search history.

(56) References Cited

U.S. PATENT DOCUMENTS 7,792,360 B2 * 9/2010 Habets .................. G06T 7/0012
382/209
8,269,791 B2 * 9/2012 Uchida ................... G06T 11/60
345/620
(Continued)

FOREIGN PATENT DOCUMENTS

CN 103353863 A * 10/2013 ........... G06F 17/218
CN 104881478 A * 9/2015 ......... G06F 16/9577
(Continued)

OTHER PUBLICATIONS

Ishihara. T et al., "A Method to add meta-information to presentation documents for recognizing the structure of the documents", IEICE Technical Report, Oct. 21, 2005, vol. 105, No. 373, pp. 1-6, IEICE(The Institute of Electronics, Information and Communication Engineers).
(Continued)

*Primary Examiner* — Laurie A Ries
(74) *Attorney, Agent, or Firm* — Eric J. Robinson; Robinson Intellectual Property Law Office, P.C.

(57) ABSTRACT

Text is generated from an object. Text is generated from a first object. The first object includes a second object and a third object. A step of detecting coordinate data of the second object is included. A step of detecting coordinate data of the third object is included. A step of extracting positional relation between the second object and the third object from coordinate data is included. A step of converting the extracted positional relation into graph data is included. A
(Continued)

step of generating text about the positional relation between the second object and the third object from graph data is included.

6 Claims, 12 Drawing Sheets

(51) Int. Cl.
*G06T 7/73* (2017.01)
*G06T 11/60* (2006.01)

(52) U.S. Cl.
CPC   *G06T 2200/24* (2013.01); *G06T 2207/20072* (2013.01)

(56) References Cited

U.S. PATENT DOCUMENTS

| | | | |
|---|---|---|---|
| 9,183,454 | B1 | 11/2015 | Ames et al. |
| 10,521,513 | B2* | 12/2019 | Mustafi .................. G06F 40/56 |
| 2003/0026459 | A1* | 2/2003 | Won ....................... G06F 16/313 |
| | | | 382/229 |
| 2003/0225473 | A1 | 12/2003 | Yamazaki |
| 2006/0104529 | A1 | 5/2006 | Messina et al. |
| 2006/0190805 | A1* | 8/2006 | Lin ........................ G06F 40/134 |
| | | | 715/234 |
| 2006/0242630 | A1 | 10/2006 | Koike et al. |
| 2006/0280373 | A1 | 12/2006 | Uchida |
| 2010/0020093 | A1 | 1/2010 | Stroila et al. |
| 2012/0022856 | A1 | 1/2012 | Prompt et al. |
| 2014/0006938 | A1* | 1/2014 | Black .................... G06T 11/206 |
| | | | 715/255 |
| 2014/0111546 | A1* | 4/2014 | Utagawa ............... G06T 19/006 |
| | | | 345/633 |
| 2014/0225928 | A1 | 8/2014 | Konnola et al. |
| 2014/0240362 | A1 | 8/2014 | Kurita |
| 2014/0282114 | A1* | 9/2014 | Walkin .................... H04L 51/52 |
| | | | 715/758 |
| 2015/0067498 | A1 | 3/2015 | Satou et al. |
| 2015/0296033 | A1* | 10/2015 | Jung ....................... H04L 65/61 |
| | | | 709/217 |
| 2016/0179901 | A1 | 6/2016 | Roberts et al. |
| 2016/0358350 | A1 | 12/2016 | Glover |
| 2016/0358353 | A1* | 12/2016 | Glover .................... G06T 7/162 |
| 2017/0185835 | A1 | 6/2017 | Appel et al. |
| 2017/0263027 | A1* | 9/2017 | Maruyama ............ G06T 11/206 |
| 2017/0270384 | A1 | 9/2017 | Wilbert et al. |
| 2017/0270405 | A1 | 9/2017 | Kurokawa |
| 2017/0301376 | A1 | 10/2017 | Kurokawa |
| 2017/0317085 | A1 | 11/2017 | Kurokawa |
| 2017/0337888 | A1 | 11/2017 | Nakagawa et al. |
| 2017/0351424 | A1 | 12/2017 | Murata |
| 2017/0357641 | A1 | 12/2017 | Okamoto |
| 2017/0365209 | A1 | 12/2017 | Kurokawa |
| 2018/0005592 | A1 | 1/2018 | Okamoto |
| 2018/0026612 | A1 | 1/2018 | Kurokawa |
| 2019/0005035 | A1 | 1/2019 | Yamazaki et al. |
| 2019/0043382 | A1* | 2/2019 | Telep ........................ G09B 5/06 |
| 2019/0146649 | A1* | 5/2019 | Satou .................... G06F 3/0484 |
| | | | 715/704 |
| 2019/0205392 | A1* | 7/2019 | Arvela .................... G06F 40/30 |
| 2020/0111244 | A1 | 4/2020 | Gruenewald et al. |
| 2020/0117347 | A1 | 4/2020 | Voliter |
| 2020/0134074 | A1* | 4/2020 | Mankovskii ............ G06F 16/26 |
| 2020/0285951 | A1 | 9/2020 | Kim et al. |
| 2020/0355749 | A1 | 11/2020 | Takahashi et al. |
| 2020/0387678 | A1 | 12/2020 | Hara et al. |
| 2020/0409963 | A1 | 12/2020 | Higashi et al. |
| 2022/0004570 | A1 | 1/2022 | Okano et al. |
| 2023/0147759 | A1 | 5/2023 | Steinbrucker et al. |

FOREIGN PATENT DOCUMENTS

| | | | | |
|---|---|---|---|---|
| CN | 110147467 A | * | 8/2019 | ......... G06F 16/7844 |
| JP | 07-028827 A | | 1/1995 | |
| JP | 2016-119082 A | | 6/2016 | |
| WO | WO-2018198105 A1 | * | 11/2018 | ........... G06T 11/206 |

OTHER PUBLICATIONS

International Search Report (Application No. PCT/IB2020/056441) Dated Oct. 20, 2020.
Written Opinion (Application No. PCT/IB2020/056441) Dated Oct. 20, 2020.

* cited by examiner

"2nd_insulator[401]" -> "1st_insulator[400]" [label=" over "]
"1st_gate_electrode[310]" -> "2nd_insulator[401]" [label=" over "]
"3rd_insulator[301a]" -> "2nd_insulator[401]" [label=" over "]
"4th_insulator[301b]" -> "2nd_insulator[401]" [label=" over "]
"3rd_insulator[301a]" -> "1st_gate_electrode[310]" [label=" over "]
"4th_insulator[301b]" -> "1st_gate_electrode[310]" [label=" over "]
"5th_insulator[302]" -> "3rd_insulator[301a]" [label=" over "]
"5th_insulator[302]" -> "4th_insulator[301b]" [label=" over "]
"6th_insulator[303]" -> "5th_insulator[302]" [label=" over "]
"7th_insulator[402]" -> "6th_insulator[303]" [label=" over "]
"8th_insulator[410a]" -> "7th_insulator[402]" [label=" over "]
"9th_insulator[410b]" -> "7th_insulator[402]" [label=" over "]
"1st_semiconductor[406a]" -> "7th_insulator[402]" [label=" over "]
"1st_semiconductor[406a]" -> "8th_insulator[410a]" [label=" over "]
"2nd_semiconductor[406b]" -> "8th_insulator[410a]" [label=" over "]
"3rd_semiconductor[406c]" -> "8th_insulator[410a]" [label=" over "]
"1st_SD_electrodes[416a1]" -> "8th_insulator[410a]" [label=" over "]
"2nd_wiring[431]" -> "8th_insulator[410a]" [label=" over "]
"11th_insulator[408]" -> "8th_insulator[410a]" [label=" over "]
"1st_semiconductor[406a]" -> "9th_insulator[410b]" [label=" over "]
"2nd_semiconductor[406b]" -> "9th_insulator[410b]" [label=" over "]
"3rd_semiconductor[406c]" -> "9th_insulator[410b]" [label=" over "]
"2nd_SD_electrodes[416a2]" -> "9th_insulator[410b]" [label=" over "]
"1st_wiring[429]" -> "9th_insulator[410b]" [label=" over "]
"11th_insulator[408]" -> "9th_insulator[410b]" [label=" over "]
"2nd_semiconductor[406b]" -> "1st_semiconductor[406a]" [label=" over "]
"3rd_semiconductor[406c]" -> "2nd_semiconductor[406b]" [label=" over "]
"10th_insulator[412]" -> "3rd_semiconductor[406c]" [label=" over "]
"1st_SD_electrodes[416a1]" -> "3rd_semiconductor[406c]" [label=" over "]
"2nd_SD_electrodes[416a2]" -> "3rd_semiconductor[406c]" [label=" over "]
"1st_SD_electrodes[416a1]" -> "10th_insulator[412]" [label=" over "]
"2nd_SD_electrodes[416a2]" -> "10th_insulator[412]" [label=" over "]
"2nd_gate_electrode[404]" -> "10th_insulator[412]" [label=" over "]
"2nd_wiring[431]" -> "1st_SD_electrodes[416a1]" [label=" over "]
"1st_wiring[429]" -> "2nd_SD_electrodes[416a2]" [label=" over "]
"3rd_wiring[430]" -> "11th_insulator[408]" [label=" over "]
"4th_wiring[432]" -> "11th_insulator[408]" [label=" over "]

FIG. 11A

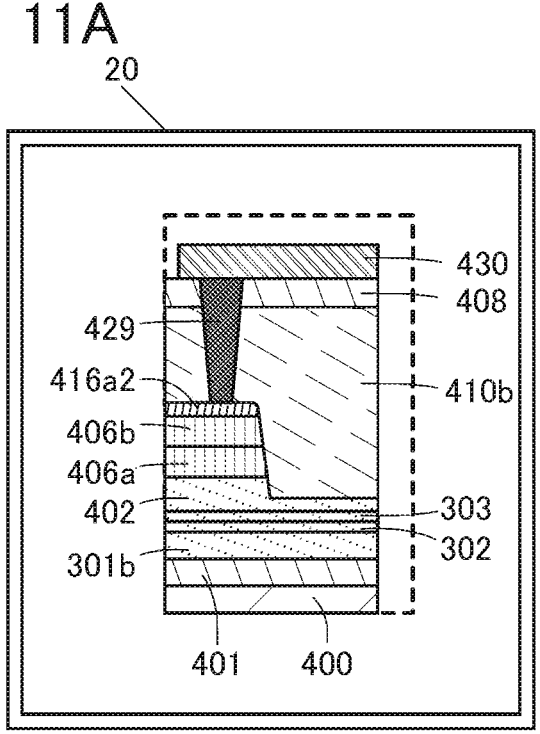

FIG. 11B

```
"2nd_insulator[401]" -> "1st_insulator[400]" [label=" over "]
"4th_insulator[301b]" -> "2nd_insulator[401]" [label=" over "]
"5th_insulator[302]" -> "4th_insulator[301b]" [label=" over "]
"6th_insulator[303]" -> "5th_insulator[302]" [label=" over "]
"7th_insulator[402]" -> "6th_insulator[303]" [label=" over "]
"9th_insulator[410b]" -> "7th_insulator[402]" [label=" over "]
"1st_semiconductor[406a]" -> "7th_insulator[402]" [label=" over "]
"1st_semiconductor[406a]" -> "9th_insulator[410b]" [label=" over "]
"2nd_semiconductor[406b]" -> "9th_insulator[410b]" [label=" over "]
"2nd_SD_electrodes[416a2]" -> "9th_insulator[410b]" [label=" over "]
"1st_wiring[429]" -> "9th_insulator[410b]" [label=" over "]
"11th_insulator[408]" -> "9th_insulator[410b]" [label=" over "]
"2nd_semiconductor[406b]" -> "1st_semiconductor[406a]" [label=" over "]
"1st_wiring[429]" -> "2nd_SD_electrodes[416a2]" [label=" over "]
"3rd_wiring[430]" -> "11th_insulator[408]" [label=" over "]
```

OBJECT-TO-TEXT CONVERSION METHOD AND SYSTEM

TECHNICAL FIELD

One embodiment of the present invention relates to a text generation method in which an object is converted into text. Another embodiment of the present invention relates to a text generation method in which an object is converted into graph data, and then, the graph data is converted into text. Another embodiment of the present invention relates to a text generation system in which an object is converted into text, utilizing a computer device. Another embodiment of the present invention relates to a text generation system for converting the contents of a drawing or the like including objects into text.

BACKGROUND ART

In recent years, image recognition using artificial intelligence (AI) has been developed. For example, the recognition rate of a subject in an image has been increasing continuously. Although AI can handle learned contents, it is difficult for AI to recognize or explain a component or the like contained in an image that AI has never learned. For example, documents such as product specifications, erection diagrams, or patent publications include a plurality of drawings. Each of the drawings includes a plurality of components. For clear explanation of the drawings used in the documents, knowledge, know-how, experience, or the like of skilled engineers is required.

For example, in a data processing field, a method for describing a plurality of components with the use of a data structure called a graph has been proposed. A graph consists of a set of vertices (nodes) and sides (edges) and is used as a means to express not only a relation between components of objects but also a variety of relations, such as connection between people in a community or a transportation network, for example (Patent Document 1).

REFERENCE

Patent Document

[Patent Document 1] Japanese Published Patent Application No. 2016-119082

SUMMARY OF THE INVENTION

Problems to be Solved by the Invention

Here, schematic views of a product, erection diagrams, drawings included in patent applications, or the like need to be converted into documents (text) according to captured features of each drawing. For example, in the explanation of the drawings included in a patent specification, the positional relation between a plurality of objects included in the drawings, or the like, has an important meaning. However, there is a problem in that variations easily occur in a range that defines (explains) the positional relation between objects. Moreover, in the case of drawing or creating figures utilizing a graphic drawing program, there is a problem in that even when displayed two objects appear to be overlapping with each other to human eyes, a state where the two objects overlap with each other or the two objects are not in contact with each other, for example, occurs on the graphic drawing program.

In view of the above problem, an object of one embodiment of the present invention is to provide a text generation method for converting an object into text. Another object of one embodiment of the present invention is to provide a text generation method for converting an object into graph data, and then converting the graph data into text. Another object of one embodiment of the present invention is to provide a text generation system for converting an object into text utilizing a computer device. Another object of one embodiment of the present invention is to provide a text generation system for converting a content of a drawing or the like including a plurality of objects into text.

Note that the description of these objects does not preclude the existence of other objects. One embodiment of the present invention does not have to achieve all these objects. Other objects will be apparent from the description of the specification, the drawings, the claims, and the like, and other objects can be derived from the description of the specification, the drawings, the claims, and the like.

Means for Solving the Problems

One embodiment of the present invention is a text generation method for generating text from a first object. The first object includes a second object and a third object. The text generation method includes a step of extracting coordinate data of the second object; a step of extracting coordinate data of the third object; a step of extracting positional relation between the second object and the third object from the coordinate data of the second object and the third object; a step of converting the positional relation between the second object and the third object into graph data; and a step of generating text about the positional relation between the second object and the third object from the graph data.

One embodiment of the present invention is a text generation system including an image processing unit, a feature extraction unit, a graph generation unit, a text generation unit, and a GUI. The image processing unit includes a step of generating a first object using a second object and a third object formed based on data input via the GUI, a step of extracting coordinate data of the second object, and a step of extracting coordinate data of the third object. The feature extraction unit includes a step of extracting positional relation between the second object and the third object from the coordinate data of the second object and the third object. The graph generation unit includes a step of converting the positional relation between the second object and the third object extracted by the feature extraction unit into graph data, and a step of displaying the graph data on the GUI. The text generation unit includes a step of generating text about the positional relation between the second object and the third object from the graph, and a step of displaying the text on the GUI.

One embodiment of the present invention is a text generation system including an image processing unit, a feature extraction unit, a graph generation unit, a text generation unit, and a GUI. The image processing unit includes a step of generating a first object using a second object and a third object formed based on data input via the GUI, a step of extracting a designated area of the first object displayed on the GUI, a step of extracting coordinate data of the second object in the designated area, and a step of extracting coordinate data of the third object in the designated area. The feature extraction unit includes a step of extracting positional relation between the second object and the third object from the coordinate data of the second object and the third object. The graph generation unit includes a step of converting the positional relation between the second object and the third object extracted by the feature extraction unit into graph data, and a step of displaying the graph data on the GUI. The text generation unit includes a step of generating text about the positional relation between the second object and the third object from the graph data, and a step of displaying the text on the GUI.

In the each of the above structures, the text generation system further includes a database in which a plurality of objects are registered. The text generation system includes a step of selecting any one of the plurality of objects registered in the database, via the GUI. The text generation system preferably includes a step of displaying the selected object on the GUI as the first object and supplying the selected object to the image processing unit.

In the each of the above structures, the feature extraction unit preferably includes a step of detecting the minimum first coordinate in the perpendicular direction from the coordinate data of the second object, a step of detecting the minimum second coordinate in the perpendicular direction from the coordinate data of the third object, and a step of extracting positional relation of the second object with respect to the third object by comparing the first coordinate and the second coordinate.

In the each of the above structures, the text generation system includes a step of converting the first object that is a raster image into a vector image. The text generation system preferably includes a step of converting the first object that is a vector image into a raster image and then converting the raster image into a vector image.

Effect of the Invention

In view of the above problem, one embodiment of the present invention can provide a text generation method in which an object is converted into text. Another embodiment of the present invention can provide a text generation method in which an object is converted into graph data and then the graph data is converted into text. Another embodiment of the present invention can provide a text generation system in which an object is converted into text utilizing a computer device. Another embodiment of the present invention can provide a text generation system for converting the contents of a drawing or the like composed of a plurality of objects into text.

Note that the effects of one embodiment of the present invention are not limited to the effects mentioned above. The effects listed above do not preclude the existence of other effects. The other effects are effects that are not described in this section and will be described below. The effects that are not described in this section are derived from the descriptions of the specification, the drawings, and the like and can be extracted from these descriptions by those skilled in the art. Note that one embodiment of the present invention is to have at least one of the effects listed above and/or the other effects. Accordingly, depending on the case, one embodiment of the present invention does not have the effects listed above in some cases.

BRIEF DESCRIPTION OF THE DRAWINGS

FIG. 8 is a diagram showing text data.
FIG. 11A is a diagram illustrating objects.
FIG. 11B is a diagram showing text data.

MODE FOR CARRYING OUT THE INVENTION

Figure 1:
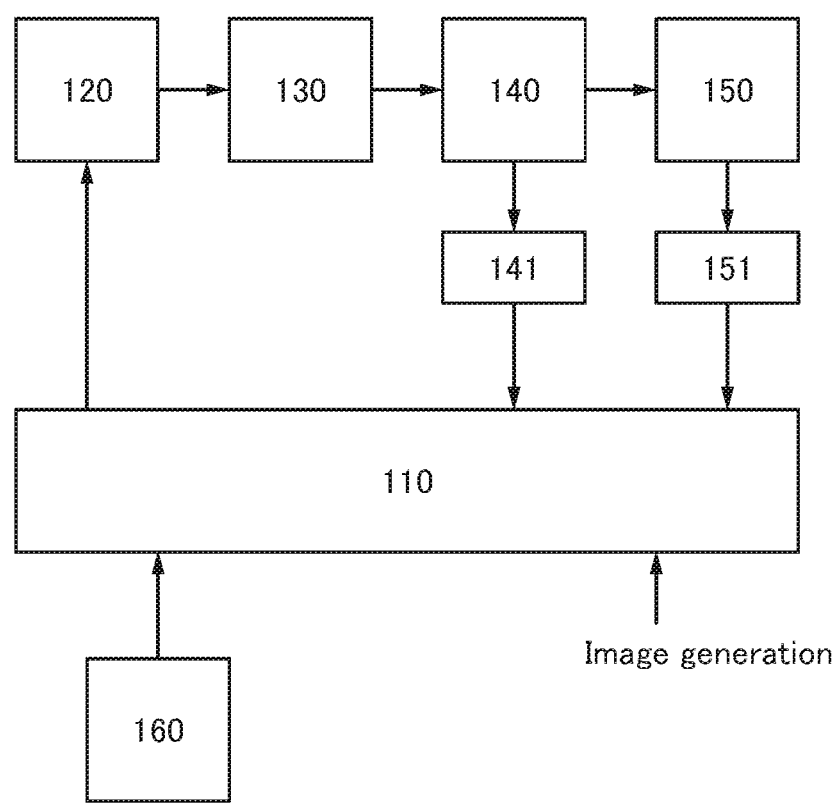
FIG. 1 is a diagram illustrating a text generation system.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the description in the following embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

In addition, the position, size, range, or the like of each structure shown in drawings does not represent the actual position, size, range, or the like in some cases for easy understanding. Therefore, the disclosed invention is not necessarily limited to the position, size, range, or the like disclosed in the drawings.

Furthermore, it is noted that ordinal numbers such as "first", "second", and "third" used in this specification are used in order to avoid confusion among components, and the terms do not limit the components numerically.

Note that in this specification, description is made focusing on drawings or the like included in schematic views of a product, erection diagrams, or patent applications. However, application is possible not only to the drawings but also to inventory management systems of buildings including a plurality of components and warehouses for storing a plurality of components, materials, products, or the like, for example.

Embodiment

One embodiment of the present invention is a method for generating text from an object. First, objects dealt with in one embodiment of the present invention are described. The objects are a graphic, a line, text, and the like composing part of an image displayed on a display device included in a computer system.

As the objects, data formed with a graphic drawing program or the like can be used. As the objects, data stored in a compressed state using a format such as PDF (Portable Document Format) or JPEG (Joint Photographic Experts Group) can also be used.

Objects can be classified into a vector image and a raster image. For example, a vector image is characterized by being described with a path. The path includes a straight line, a rectangle, a Bezier curve, or the like. In other words, the vector image has detailed coordinate data of an object. Note that the path can not only express a graphic but also include a property such as hatching (or filling). Thus, data on a variety of states, compositions, materials, or the like can be provided to an object described with the path when a user provides data on hatching or the like to the object.

In a raster image, image data is expressed with an aggregate of pixels arranged in a lattice pattern (grid). Note that when objects are stored as raster images using JPEG or the like in a state where the objects and the like overlap with each other, only displayed data is stored. In other words, when a plurality of objects are positioned to overlap with each other, data on objects displayed on a display surface is stored, and data on objects that are not displayed by the overlap is lost. In one embodiment of the present invention, the case where an object is a vector image is described first. Note that an example of using a raster image is described in detail with reference to FIG. 3.

In this embodiment, a method for generating text that describes positional relation data of a first object created using a graphic drawing program or the like is described. Note that the graphic drawing program can generate a vector image when a user draws a graphic with a computer system, a display device, and an input device included in a computer system. Accordingly, the method for generating text that describes the positional relation data of the first object from the first object may be rephrased as a text generation system.

Note that the graphic drawing program is stored in a memory device included in the computer device. The graphic drawing program can generate text that describes the positional relation data of the first object and draw or store an object according to an instruction given by a user via the input device, utilizing a processor included in the computer device. Note that in the following description, description of the computer device or the graphic drawing program is omitted for simplicity of description in some cases.

A processing procedure of one embodiment of the present invention is described. The first object is generated by the graphic drawing program or the like. Thus, the first object is preferably a vector image. In addition, the first object includes a second object and a third object.

Next, the processing procedure includes a step of extracting the coordinate data of the second object and the third object. The processing procedure includes a step of extracting the positional relation between the second object and the third object from the coordinate data of the second object and the third object. Regarding the positional relation between the second object and the third object, it is preferably possible to distinguish in detail whether one of the objects is positioned on the left, right, upper, or lower side of the other object, one of objects is included in the other object, or one of objects is in contact with the other object.

Next, the processing procedure includes a step of converting the positional relation between the second object and the third object into graph data. The graph data includes data that distinguishes in detail what positional relation the second object and the third object have. The processing procedure includes a step of generating text about the positional relation between the second object and the third object from the graph data. With the above procedure, the graphic drawing program can generate, from the first object, text that describes the first object. Note that the program for generating, from the first object, text that describes the first object may be processed by a program that is different from the graphic drawing program. Alternatively, the program for generating, from the first object, the text that describes the first object may be included in the graphic drawing program.

Next, a method and a system for generating, from the first object, text that describes the first object are described with reference to FIG. 1 to FIG. 12.

A text generation system 100 for generating text from an object illustrated in FIG. 1 includes a GUI (Graphical User Interface) 110, an image processing unit 120, a feature extraction unit 130, a graph generation unit 140, a text generation unit 150, and a database 160. The GUI 110 is a program for providing a function of displaying an object on a display device, a drawing tool for creating figures, a function of storing or reading an object, or the like. The GUI 110 is preferably included in the graphic drawing program.

A user can generate a first object via the GUI 110. Alternatively, the user can select any one of a plurality of objects stored in the database 160 as a first object.

Object data of the first object is given to the image processing unit 120 via the GUI 110. Note the first object is composed of a plurality of objects. The image processing unit 120 has functions of extracting coordinate data from the object data, converting a raster image into a vector image, converting a vector image into a raster image, removing noise, designating a selected area of the first object, and the like. In the noise removal, a region where the plurality of objects overlap with each other is removed. Note that when the selected area is designated, the image processing unit 120 has a function of converting only objects included in the selected area into text data. The image processing unit 120 outputs object data of a vector image.

The object data is given to the feature extraction unit 130 from the image processing unit 120. The feature extraction unit 130 extracts the positional relations between the objects. Since object data included in each object includes coordinate data, the positional relations between the objects are extracted by comparing the pieces of coordinate data. Note that for positional relation data, any one or more pieces of data on whether one of the objects is on the left, right, upper, or lower side of another of the objects, one of the objects is included in another of the objects, or one of the objects is in contact with another of the objects are selected. A method for extracting the positional relations between the objects is described in detail with reference to FIG. 6.

The object data and the positional relation data of objects are supplied to the graph generation unit 140. The graph generation unit 140 generates graph data 141 for describing the first object on the basis of the positional relation data of objects. Note that the graph generation unit 140 can display the graph data 141 on the GUI 110. A generation example of the graph data 141 is described in detail with reference to FIG. 7.

The text generation unit 150 generates text data 151 from the graph data 141. The text generation unit 150 can display the text data 151 on the GUI 110. Thus, a user can check whether the first object generated by the user has an intended relation, using the graph data 141 or the text data 151. In addition, the user can check whether objects are in contact with each other. The user can also check whether the plurality of objects do not include a region overlapping with each other. Note that the text data 151 generated from the graph data 141 is described in detail with reference to FIG. 8.

Figure 2:
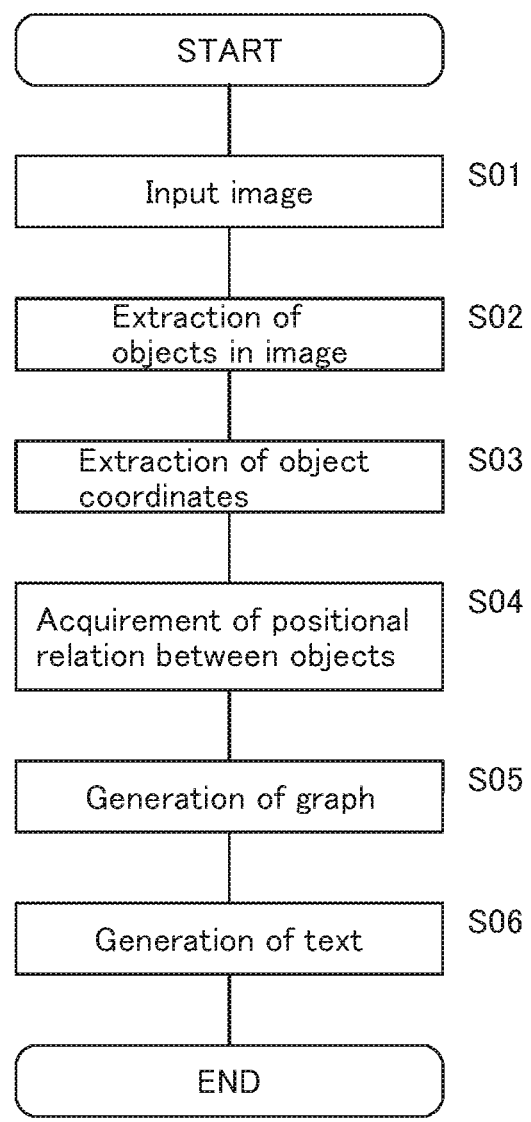
FIG. 2 is a flow chart showing a text generation method.

FIG. 2 is a flow chart showing the operation of the text generation system 100 for generating text from an object, which is illustrated in FIG. 1. Note that an image can be treated as the first object. The case where the first object includes a second object and a third object is described below. In other words, the first object is generated using the second object and the third object.

Step S01 is a step of inputting an image as the first object via the GUI 110 by the user. Alternatively, any one of a plurality of images stored in the database 160 can be selected as the first object via the GUI 110.

Step S02 is a step of extracting the second and third objects included in the first object. The second and third objects to be extracted include different pieces of object data.

Step S03 is a step of extracting coordinate data included in the object data. Note that each object is preferably a vector image. The use of a vector image allows easy extraction of coordinate data.

Step S04 is a step of acquiring data on positional relations between the objects. Since each piece of object data includes coordinate data, for example, data on the positional relation of the third object with respect to the second object is extracted by comparing the minimum y-coordinate of the second object and the minimum y-coordinate of the third object. Data on positional relation of the third object with respect to the second object is extracted by comparing the minimum y-coordinate of the second object and the maximum y-coordinate of the third object. The positional relation data on whether one of the objects is on the left, right, upper, or lower side of the other object, one of the objects is included in the other object, or one of the objects is in contact or not in contact with the other object can be extracted by comparing a variety of coordinates of the objects as described above. Note that for the positional relation data, any one or more pieces of data on whether one of the objects is on the left, right, upper, or lower side of the other object, one of the objects is included in the other object, or one of the objects is in contact or not in contact with the other object are provided as an extraction result.

In Step S05, the positional relation of the third object with respect to the second object, which has been extracted in Step S04, is converted into a graph structure to generate the graph data 141. Note that the generated graph data 141 can be displayed on the GUI 110.

In Step S06, the text data 151 is generated from the graph data 141 that is generated in Step S05. Note that the generated text data 151 can be displayed on the GUI 110.

Figure 3:
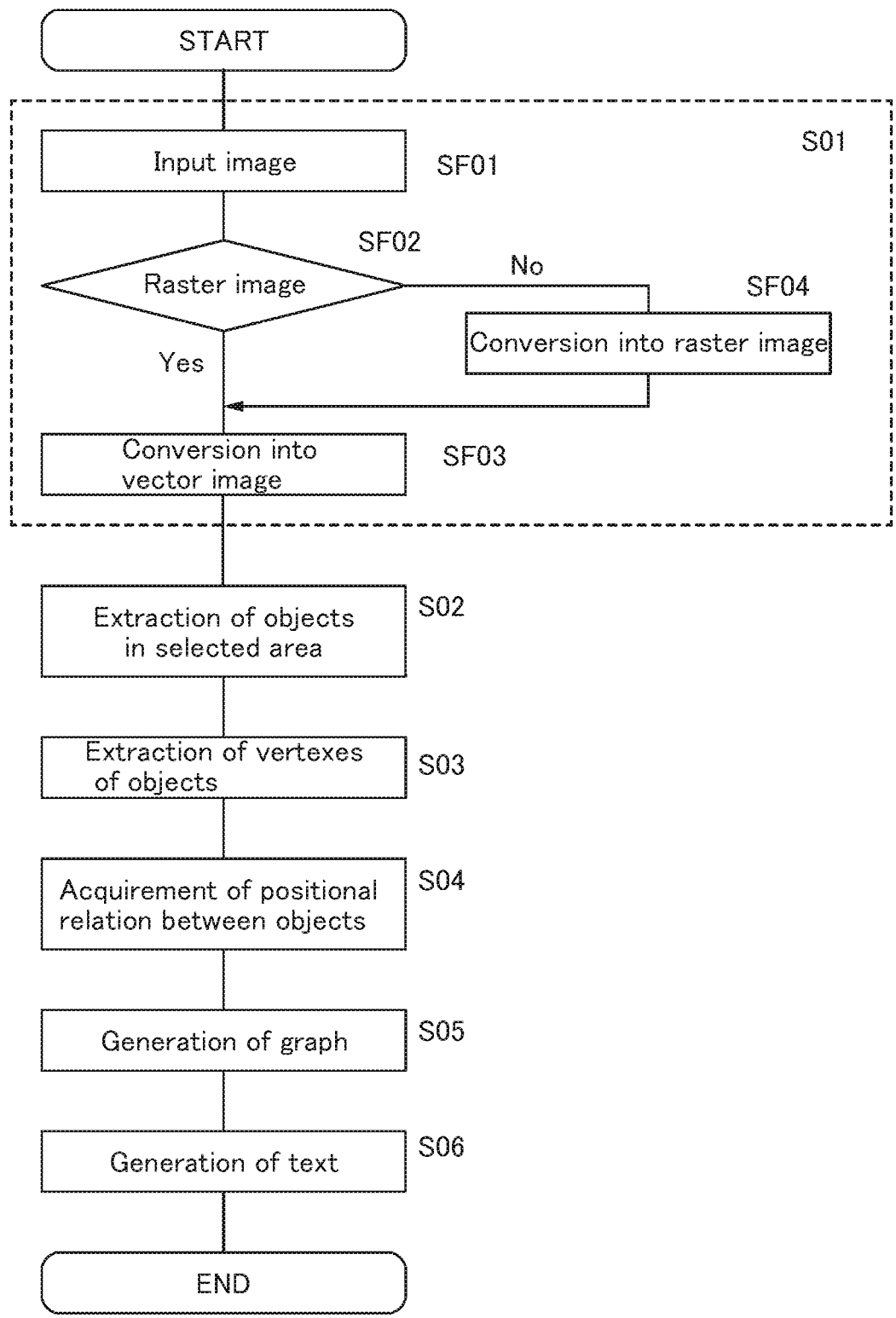
FIG. 3 is a flow chart showing a text generation method.

FIG. 3 is a flow chart showing the operation of the text generation system 100 for generating text from an object, which is different from that in FIG. 2. Note that in structures of the invention described below, the same portions or portions having similar functions are denoted by the same reference numerals in different drawings, and the description thereof is not repeated.

A first object including a region where the second object and the third object overlap with each other is explained in FIG. 3. For example, in the case where the first object is displayed on a display device, the first object is displayed on the display device in accordance with display properties supplied to the second object and the third object (e.g., the overlapping order of the objects). However, in the case where the positional relation between the objects is converted into text data to be output, it is difficult to determine which of the second object and the third object is in an effective state by a computer device.

Accordingly, as a measure for the case of including a region where the second object and the third object overlap with each other, Step S01 further includes a plurality of steps.

Step SF01 is a step of receiving an image input via the GUI 110. Alternatively, any one of a plurality of images stored in the database 160 can be selected as the first object via the GUI 110. Thus, Step SF01 has the same function as Step S01 in FIG. 2.

Step SF02 is a step of determining whether the first object is a raster image. In the case where the first object is a raster image, there is no region where the second object and the third object overlap with each other. Consequently, the process moves to Step SF03.

Note that in the case where the first object is a vector image, there is a region where the second object and the third object overlap with each other in some cases. Accordingly, the process moves to Step SF04, and the first object is converted from a vector image into a raster image. Converting the first object into a raster image removes the data on an object positioned in a layer below the region where the second object and the third object overlap with each other in accordance with display properties. Next, the process moves to Step SF03.

Step SF03 is a step of converting the first object that is a raster image into a vector image. Data on the region where the second object and the third object overlap with each other in the first object image is removed in the step of converting a vector image into a raster image. Next, the process moves to Step S02. The description in subsequent steps is the same as that in the flow chart in FIG. 2; thus, the description thereof is omitted.

As shown in FIG. 3, using the characteristics of a raster image and a vector image effectively allows removal of data on a region where a plurality of different objects overlap with each other. Thus, adding the steps as shown in FIG. 3 allows removal of a region where objects included in the first object overlap with each other (noise component).

Figure 4:
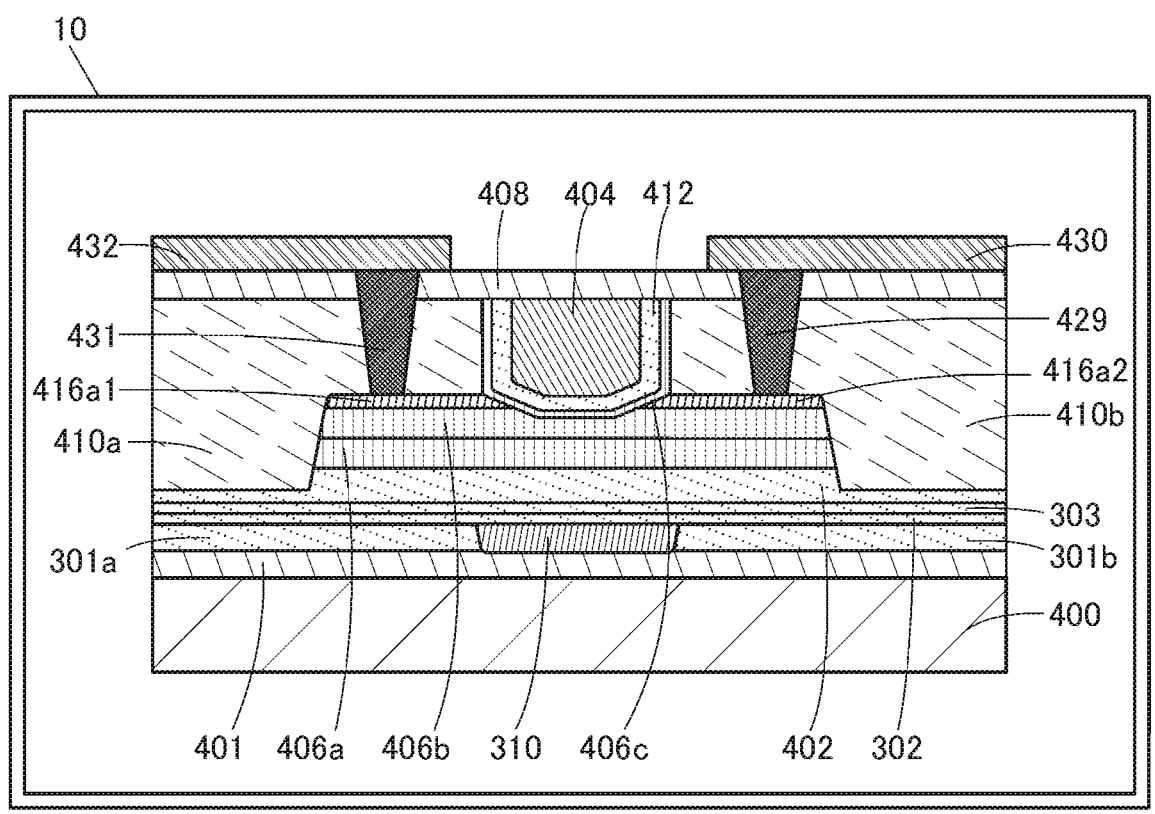
FIG. 4 is a diagram illustrating objects included in a conceptual diagram.

FIG. 4 is a conceptual diagram 10 used as an example. The conceptual diagram 10 includes the first object. The first object is a schematic cross-sectional view of a transistor composed of a plurality of objects. The transistor includes a plurality of insulating layers, a plurality of conductive layers, and a plurality of semiconductor layers. Note that in some cases, the insulating layers have a plurality of different compositions, the conductive layers have different compositions or different stacked-layer structures, and the semiconductor layers have different compositions or different additives.

An object 400, an object 401, an object 301$a$, an object 301$b$, an object 302, an object 303, an object 402, an object 410$a$, an object 410$b$, an object 408, and an object 412 illustrated in FIG. 4 are insulating layers.

An object 310, an object 416$a$1, an object 416$a$2, an object 404, an object 429, an object 430, an object 431, and an object 432 are conductive layers.

An object 406$a$, an object 406$b$, and an object 406$c$ are semiconductor layers.

Note that hatching data can be given to each of the objects in order that a computer device distinguishes between the insulating layer, the conductive layer, and the semiconductor layer. Note that in FIG. 4, the same hatching data is given to insulating layers, conductive layers, and semiconductor layers that have the same composition, for an example.

Figure 5:
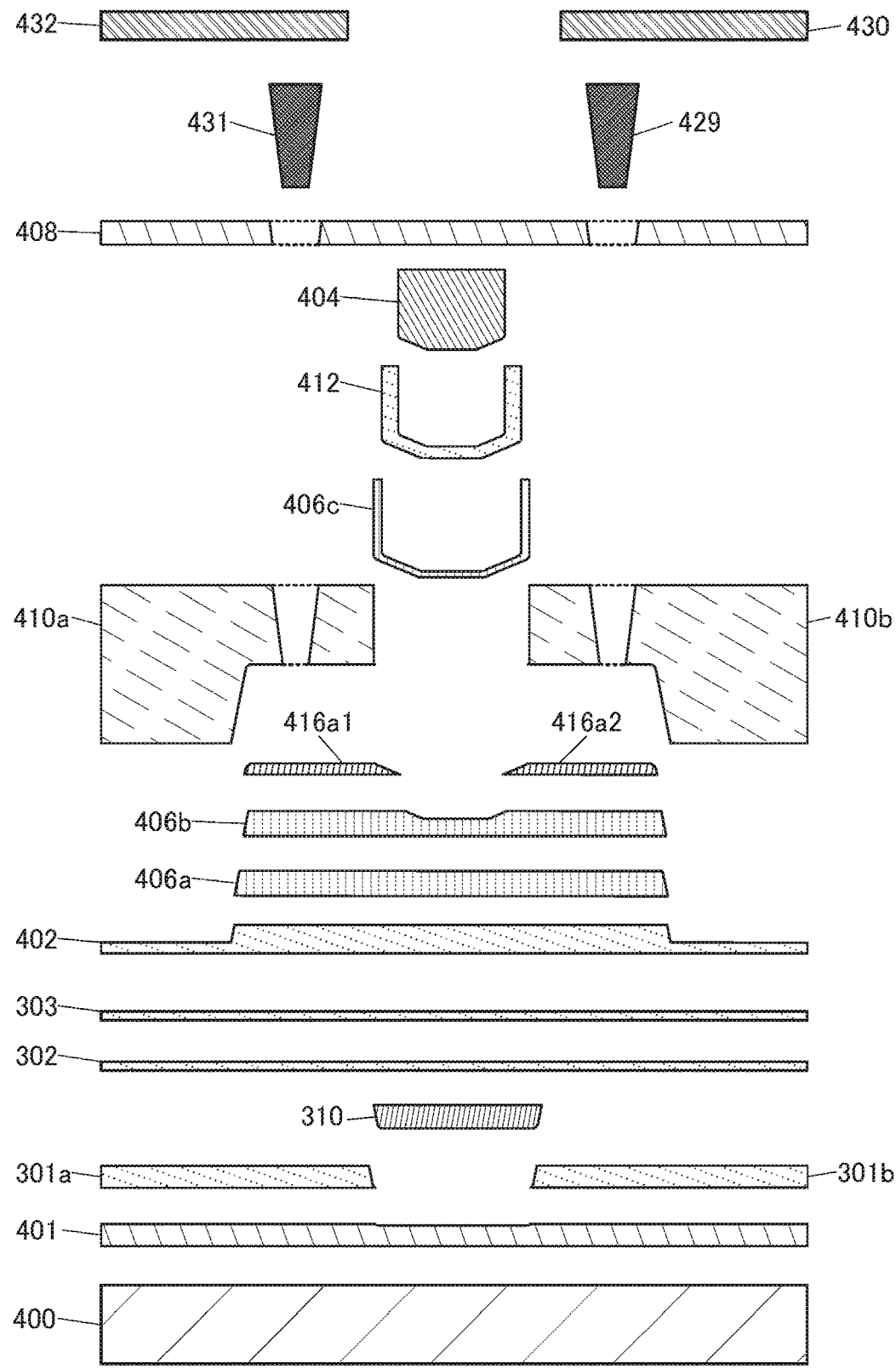
FIG. 5 is a developed diagram illustrating objects.

FIG. 5 is a developed diagram of the first object illustrated in FIG. 4 and broken down into a plurality of objects. The object 410$a$ and the object 408 each include a region overlapping with the object 431; however, object data of the objects positioned in a layer below the overlap regions is removed by executing Step SF04 of converting the first object into a raster image. The object 410$b$ and the object 408 each include a region overlapping with the object 429; however, object data of the objects positioned in a layer below the overlap regions is removed by executing Step SF04 of converting the first object into a raster image. Although the object 410$a$ and the object 410$b$ are insulating layers formed in the same process, different names are given to the objects by a user as illustrated in the conceptual diagram 10 in some cases. Note that in the case where text for describing an object is generated from the object, it is preferable that a name be given to each object.

Figure 6A:
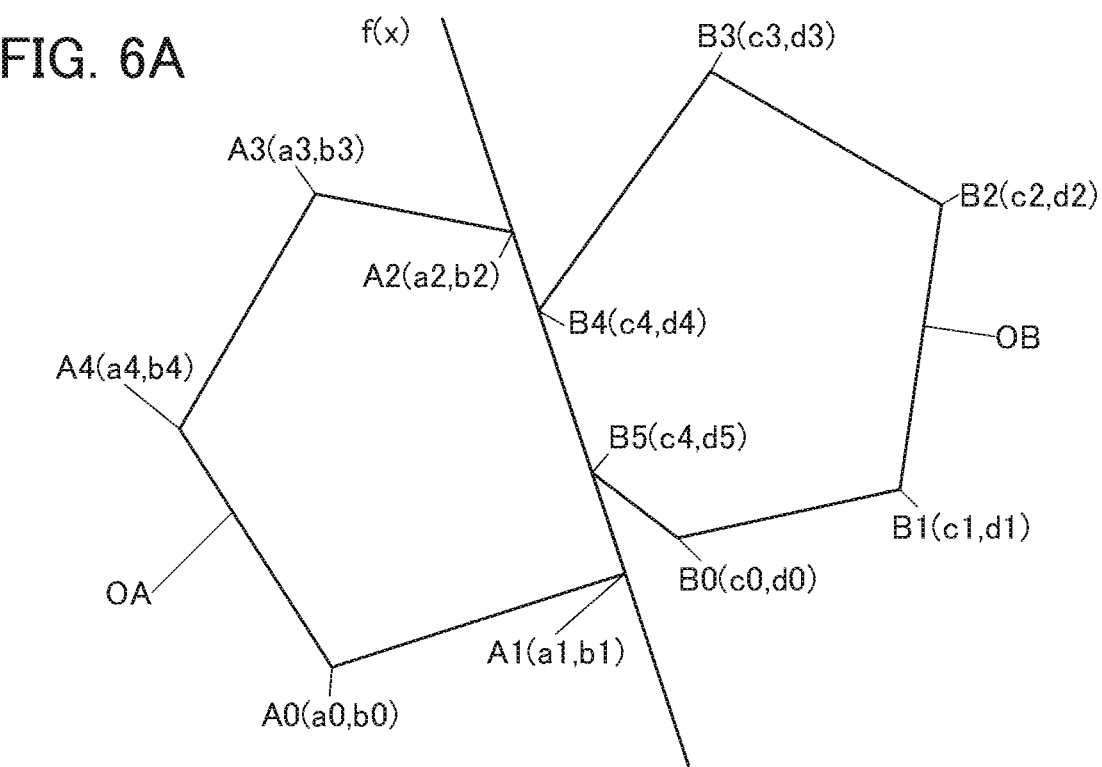
FIG. 6A is a diagram illustrating a method for extracting positional data of an object.
Figure 6B:
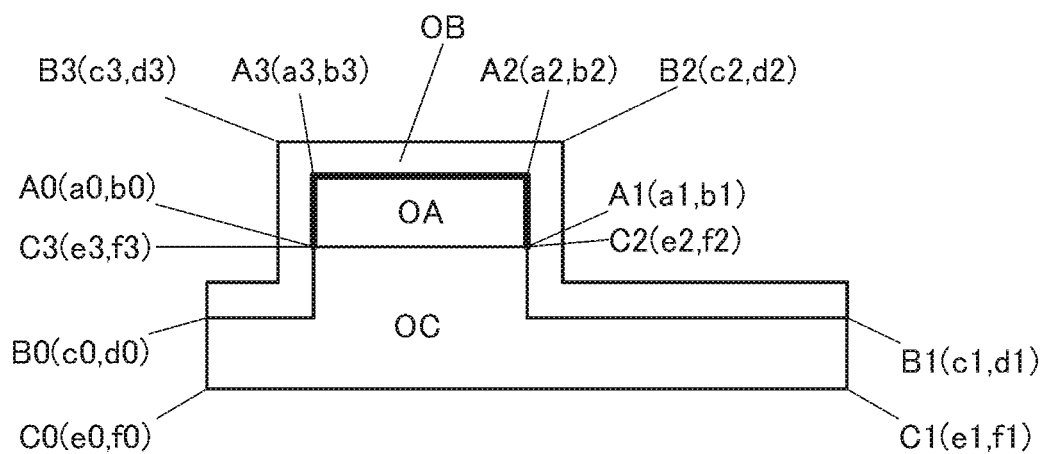
FIG. 6B is a diagram illustrating a method for extracting positional data of an object.

FIG. 6A and FIG. 6B are diagrams illustrating methods for extracting positional data of objects. FIG. 6A is an example in which an object OA and an object OB are positioned in contact with each other. The object OA and the object OB are vector images. When an object, which is a vector image, is a polygon, the object has the coordinates of each vertex as the coordinate data, and when an object, which is a vector image, is a circle, the object has the radius and the coordinates of the center as the coordinate data. For example, the object OA includes vertex coordinates A0 to vertex coordinates A4, and the object OB includes vertex coordinates B0 to vertex coordinates B5.

First, a method for determining the positional relation between the polygonal object OA and the polygonal object OB is described with reference to FIG. 6A. For example, a vertex whose y-coordinate is the minimum among the vertex coordinates A0 to the vertex coordinates A4 included in the object OA is extracted. Next, a vertex whose y-coordinate is the minimum among the vertex coordinates B0 to the vertex coordinates B5 included in the object OB is extracted. When the y-coordinate of the vertex which is the minimum among the vertex coordinates A0 to the vertex coordinates A4 is smaller than the y-coordinate of the vertex which is the minimum among the vertex coordinates B0 to the vertex coordinates B5, it can be determined that at least the object OA includes a region positioned below the object OB. Similarly, by comparing of the vertexes of the objects, the positional relation between the object OA and the object OB can be determined.

Next, a method for determining whether the object OA and the object OB are in contact with each other is described. For example, a linear expression $f(x)$ of a straight line that extends through adjacent vertexes of the vertex coordinates A0 to the vertex coordinates A4 included in the object OA is determined. When the distance between the linear expression $f(x)$ and the vertex having any one of the vertex coordinates B0 to the vertex coordinates B5 included in the object OB is "0" and the distance between the vertex adjacent to the vertex having any one of the above vertex coordinates and the linear expression $f(x)$ is "0", it can be determined that the object OA is in contact with the object OB.

By determining of the vertexes included in each object using all conditions as described above, more accurate data on their positional relation can be obtained. Note that a neural network may be used when comparing all the vertexes with each other.

A method for determining the positional relation between an object OA, an object OB, and an object OC, which are polygons, illustrated in FIG. 6B is described. For example, a vertex having the maximum y-coordinate and the maximum x-coordinate, a vertex having the maximum y-coordinate and the minimum x-coordinate, a vertex having the minimum y-coordinate and the maximum x-coordinate, and a vertex having the minimum y-coordinate and minimum x-coordinate are extracted from the vertexes of each of the object OA, the object OB, and the object OC.

For example, the vertex coordinates extracted from the object OA are vertex coordinates A0 to vertex coordinates A3. The vertex coordinates A3 are the coordinates of a vertex having the maximum y-coordinate and the minimum x-coordinate, and the vertex coordinates A2 are the coordinates of a vertex having the maximum y-coordinate and the maximum x-coordinate. The vertex coordinates A0 are the coordinates of a vertex having the minimum y-coordinate and the minimum x-coordinate, and the vertex coordinates A1 are the coordinates of a vertex having the minimum y-coordinate and the maximum x-coordinate.

The vertex coordinates extracted from the object OB are vertex coordinates B0 to vertex coordinates B3, and characteristic vertexes can be extracted as in the case of the object OA. The vertex coordinates extracted from the object OC are vertex coordinates C0 to vertex coordinates C3, and characteristic vertexes can be extracted as in the case of the object OA.

For example, in the case where the y-coordinates of the vertex coordinates A2 and the vertex coordinates A3 are smaller than the y-coordinates of the vertex coordinates B2 and the vertex coordinates B3, the object OB at least includes a region positioned above the object OA. In addition, in the case where the y-coordinates of the vertex coordinates A0 and the vertex coordinates A1 is larger than the y-coordinates of the vertex coordinates B0 and the vertex coordinates B1, the object OB at least includes a region positioned below the object OA.

Here, as described in FIG. 6A, determination whether the object OA, the object OB, and the object OC are in contact with each other is performed using the vertex coordinates of the objects. Although the detailed description is omitted, it is found that the distance between a linear expression of a straight line connecting the vertex coordinates A2 and the vertex coordinates A3 of the object OA and any one of the vertex coordinates B of the object OB is "0". Accordingly, it can be determined that the object OB is positioned above and in contact with the object OA.

It is also found that the distance between a linear expression of a straight line connecting the vertex coordinates A0 and the vertex coordinates A3 of the object OA and the vertex coordinates B of the object OB is "0". Accordingly, it can be determined that the object OB is positioned in contact with the left side surface of the object OA. Similarly, the distance between a linear expression of a straight line connecting the vertex coordinates A1 and the vertex coordinates A2 of the object OA and any one of the vertex coordinates B of the object OB is "0". Accordingly, it can be determined that the object OB is positioned in contact with the right side surface of the object OA. Thus, it can be determined that the object OB is in contact with the object OA so as to cover the object OA.

Note that a plurality of terms that represent positional relations are preferably registered. The terms have different conditions to determine positional relations.

For example, it can be determined that "the object OB is positioned over the object OA".

For example, it can be determined that "the object OB is positioned above the object OA".

For example, it can be determined that "the object OB is over and in contact with the object OA".

For example, it can be determined that "the object OB is in contact with the object OA so as to cover the object OA".

Figure 7:
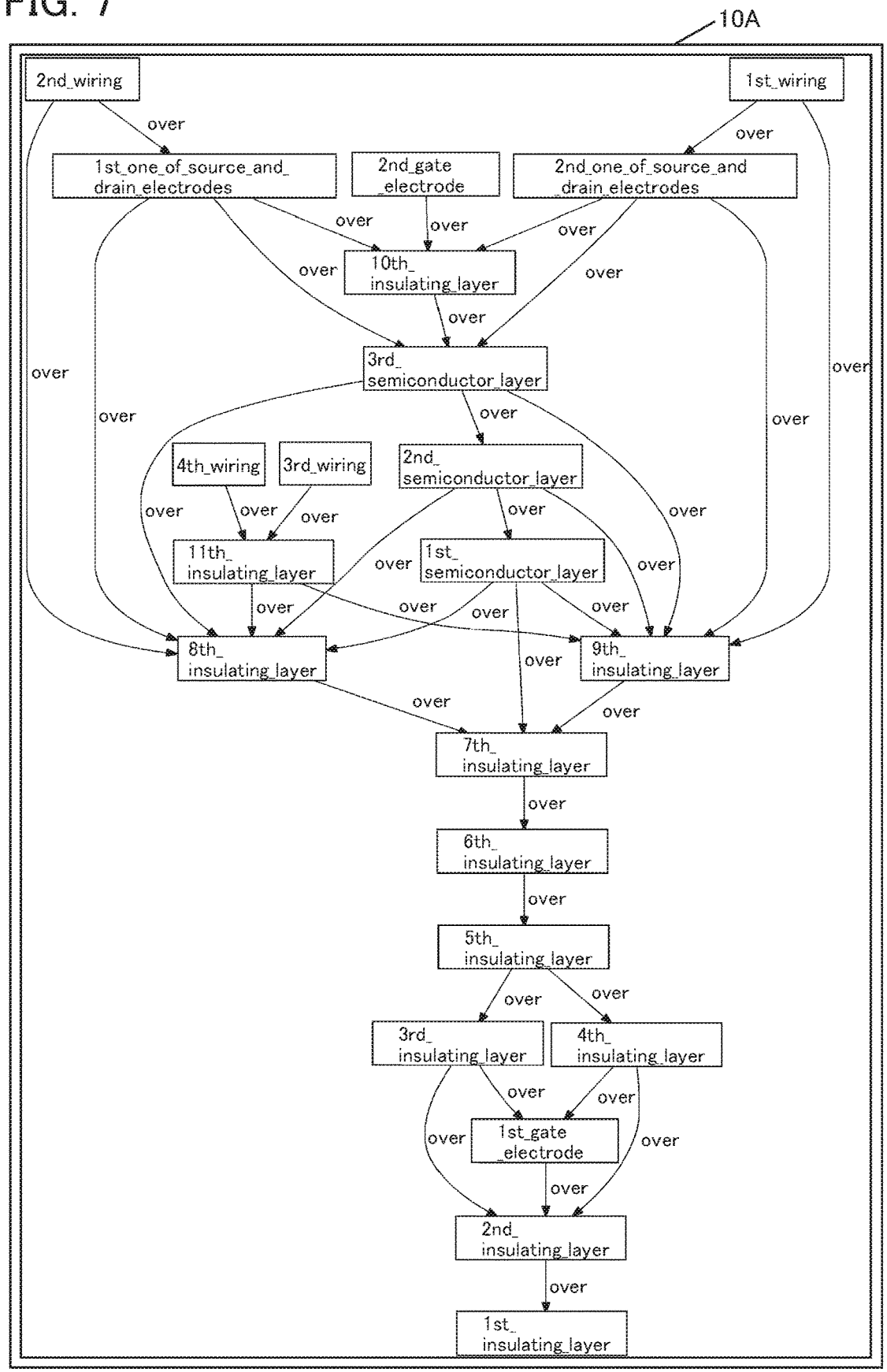
FIG. 7 is a diagram showing graph data.

FIG. 7 is a diagram showing graph data. FIG. 7 is a result obtained by converting positional relation data of each of the objects described in FIG. 4 into graph structures and then outputting the graph structures as graph data 10A. For example, the object 400 is represented as "1st_insulating_Layer". Note that in FIG. 7, for simplicity of description, positional relation data on which of a target object and a compared object is over (shown as "over") the other is extracted, for example.

FIG. 8 is a diagram showing text data 10B. FIG. 8 is an example of the case where the positional relation data of the objects extracted as the graph data 10A in FIG. 7 is represented as the text data 10B. Note that a rule of description for outputting the positional relation data of the objects as text data is described below.

Target object->compared object[label=detection position]

A target object is described on the left side, and a compared object and the detection position of the target object with respect to the compared object are represented as a positional relation label, on the right side.

The first row is described as an example. "2nd_insulator [401]"->"1st_insulator[400]"[label–"over"] translates to "the insulating layer [401] is over the insulating layer [400]".

Figure 9:
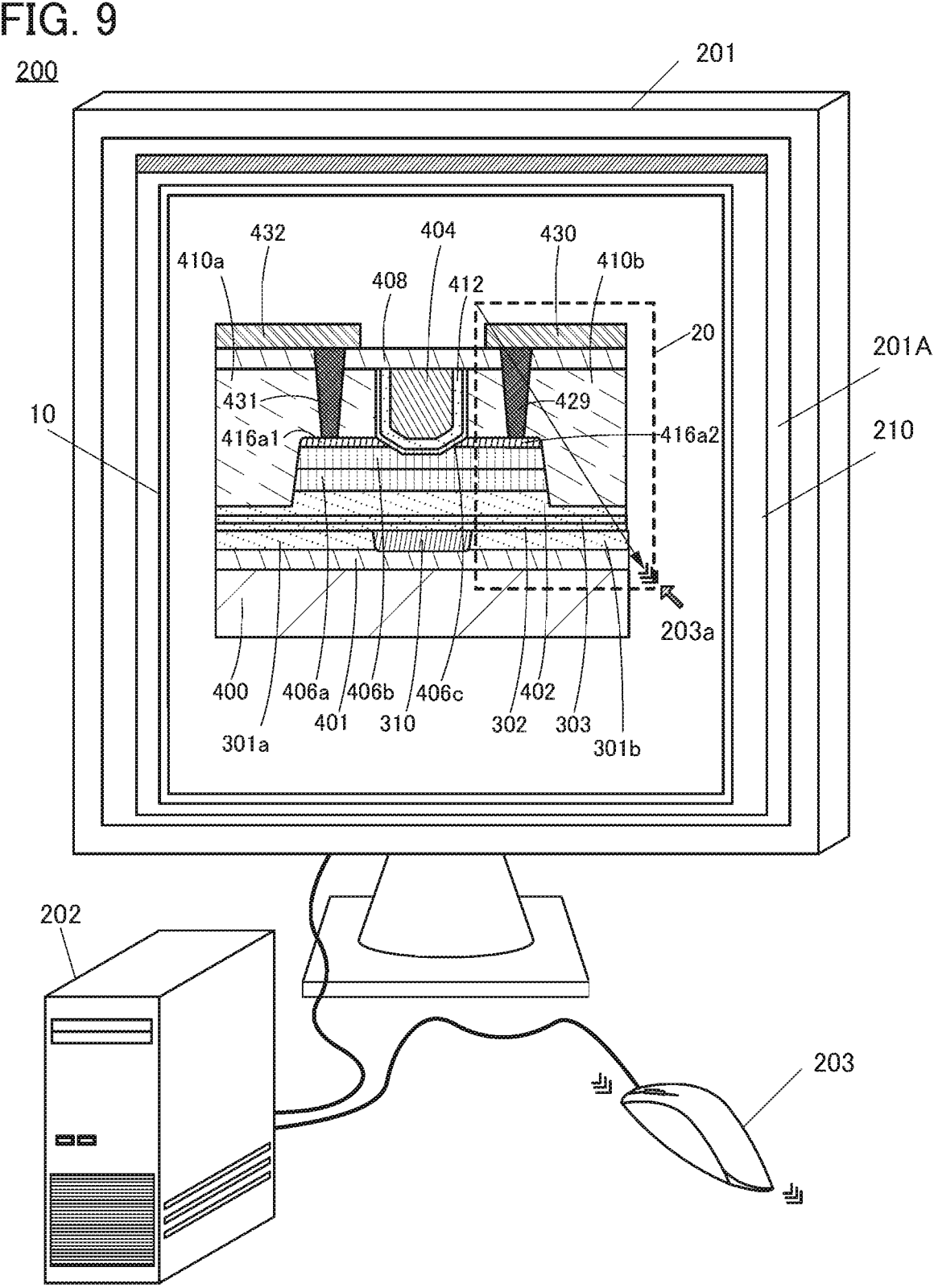
FIG. 9 is a diagram illustrating a text generation system.

FIG. 9 is a diagram illustrating a computer system 200. The computer system 200 includes a display device 201, a computer device 202, and an input device 203. The display device 201 includes a display region 201A. A GUI 210 is displayed on the display region 201A. The GUI 210 allows drawing of an object and searching of an object from a database, using the input device 203. Note that although not displayed in FIG. 9, the GUI 210 can display the graph data 10A shown in FIG. 7, the text data 10B shown in FIG. 8, or the like.

In one embodiment of the present invention, an area 20, which is part of an object included in the conceptual diagram 10 displayed on the GUI 210, is focused on and can be converted into text. Note that the area 20 can be selected easily using a cursor 203a operated by the input device 203. In the object in which the selected area is designated, only a region of the object included in the selected area is a target area to be converted into text data. Thus, coordinate data included in object data is updated to be within the selected area.

Figure 10:
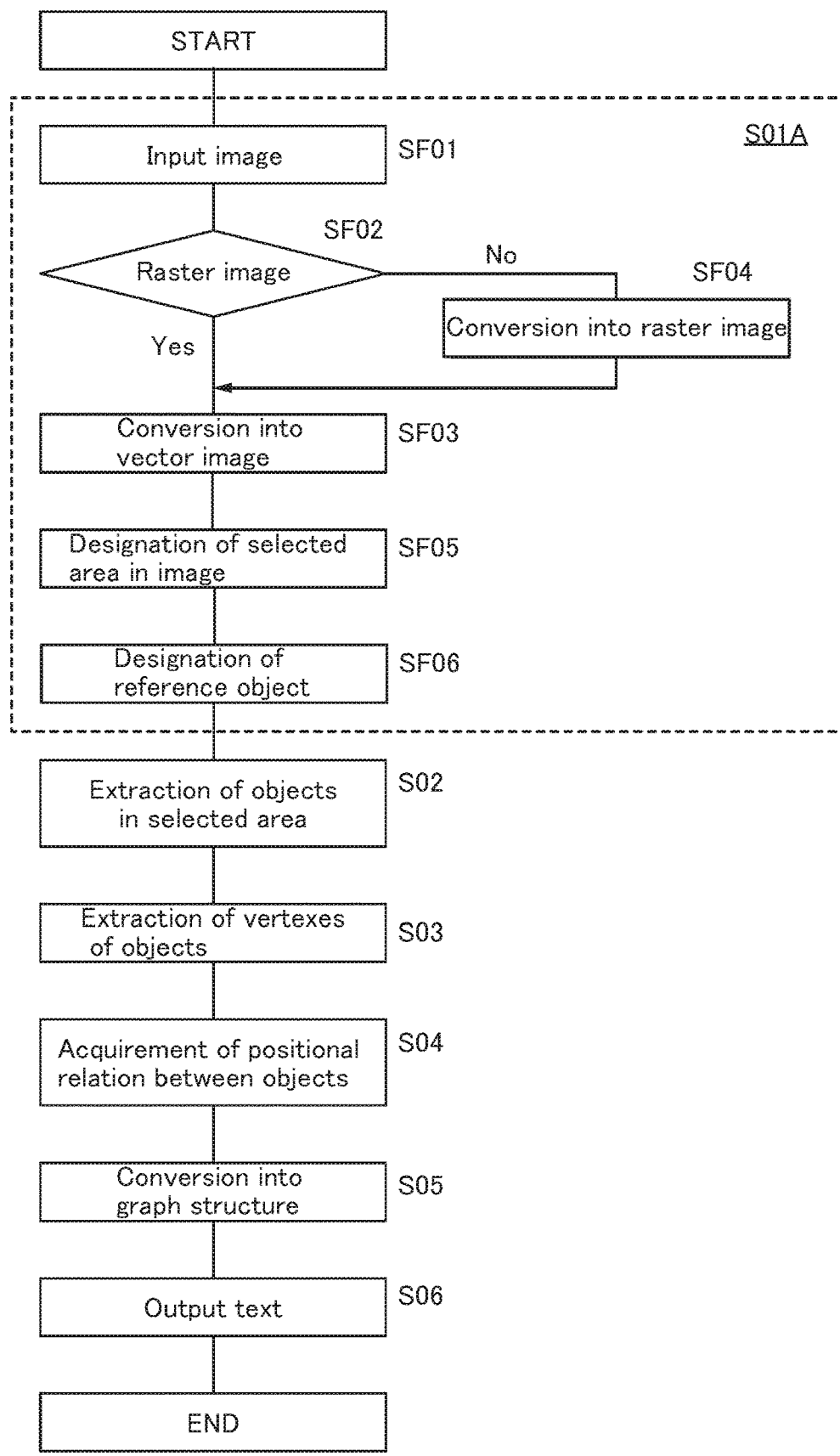
FIG. 10 is a flow chart showing a text generation method.

FIG. 10 is a flow chart showing the operation of the text generation system 100 for generating text from an object, which is different from that in FIG. 3. In FIG. 10, text is generated from data on the positional relation between objects that are selected by the area 20 in FIG. 9. Note that in structures of the present invention described below, the same portions or portions having similar functions are denoted by the same reference numerals in different drawings, and the description thereof is not repeated.

FIG. 10 is different from FIG. 3 in that Step SF05 and Step SF06 are included. Step SF05 is a step of designating the area 20 from an object displayed on the GUI 210 as a selected area.

Objects included in the area 20 set by a user remove object data of a region which is outside the area 20 and update coordinate data of the object data. Thus, the user can see data of the positional relation between the objects included in the area 20 in the form of text. For example, when an object includes many components, objects in an area set by the area 20 from the object are converted into text data, whereby the contents of the objects can be confirmed. As a different example, when claims of a patent are created, part of an area in patent drawings which is focused on can be utilized as support data for defining all the positional relation between objects.

In Step SF06, reference objects can be designated as a reference position for generation of graph data or text data.

For example, when claims of a patent are created, parts of objects are designated as reference objects, and graph data having a graph structure or text data can be generated from data on positional relation relative to the reference objects.

Next, the process moves to Step S02. The description in subsequent steps is the same as that in the flow chart in FIG. 2; thus, the description thereof is omitted.

Designating the area 20 as shown in the flow chart of FIG. 10 facilitates acquirement of detailed positional relation data on an area which a user focuses on. Furthermore, designating reference objects facilitates acquirement of positional relation data on, for example, whether an object is on the left, right, upper, or lower side of the reference object, or is in contact with the reference object.

FIG. 11A is a diagram showing, as an example, the objects selected by the area 20 in FIG. 10. For example, the coordinate data of the object 400 is updated by selecting the object 400 by the area 20. The coordinate data of the object 401, the object 301b, the object 302, the object 303, the object 402, the object 406a, the object 406b, the object 416a2, the object 410b, the object 408, the object 429, and the object 430 is updated in a similar manner.

FIG. 11B is text data 20A describing the objects selected by the area 20 in FIG. 11A. Data only on the area selected by the area 20 is generated as graph data (not shown) having a graph structure and the text data 20A.

Figure 12:
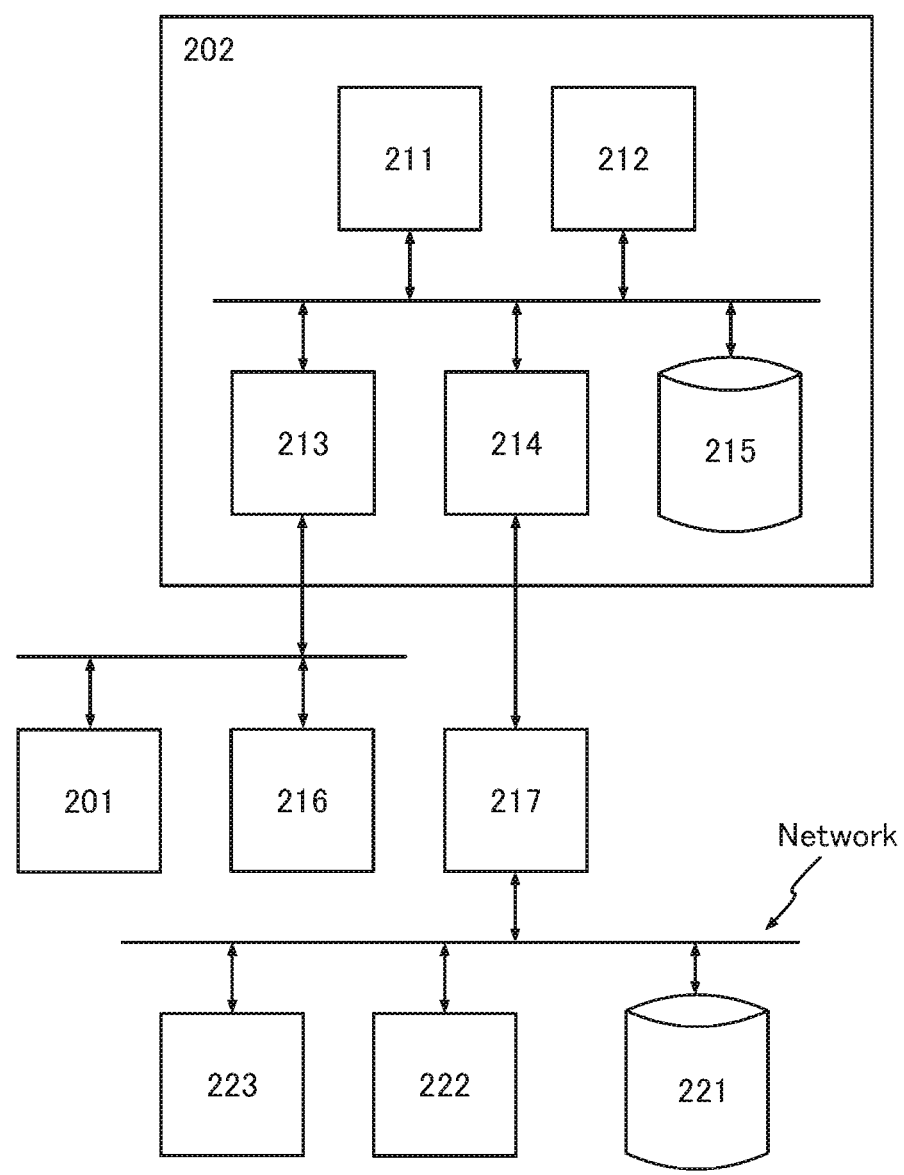
FIG. 12 is a diagram illustrating a text generation system.

FIG. 12 is a diagram showing a system for generating text from an object. The system for generating text from an object utilizes a computer device. The computer device 202 is connected to a database 221, a remote computer 222, or a remote computer 223 through a network. The computer device 202 includes an arithmetic device 211, a memory 212, an input/output interface 213, a communication device 214, and a storage 215. The computer device 202 is electrically connected to the display device 201 and a keyboard 216 through the input/output interface 213. In addition, the computer device 202 is electrically connected to a network interface 217 through the communication device 214, and the network interface 217 is electrically connected to the database 221, the remote computer 222, and the remote computer 223 through the network.

Here, examples of the network include a local area network (LAN), the Internet, and the like. In addition, either one or both of wired and wireless communications can be used for the network. Furthermore, in the case where a wireless communication is used for the network, besides near field communication means such as Wi-Fi (registered trademark) and Bluetooth (registered trademark), a variety of communication means such as the third generation mobile communication system (3G)-compatible communication means, LTE (sometimes also referred to as 3.9G)-compatible communication means, the fourth generation mobile communication system (4G)-compatible communication means, or the fifth generation mobile communication system (5G)-compatible communication means can be used.

A generation of text from an object, which is one embodiment of the present invention, is executed by a program. The program is stored in the memory 212 or the storage 215 included in the computer device 202. The program generates text from an object using the arithmetic device 211. The program allows the display device to perform display through the input/output interface 213. A user gives an instruction to a GUI displayed on the display device 201 using a keyboard or a mouse, whereby an image (object) of a drawing included in product specifications, erection diagrams, patent publications, or the like can be given to the program. The display device 201 can display graph data or text data generated from the object.

Note that the program for executing a method for generating text from an object can also be utilized in the remote computer 222 or the remote computer 223 through the network. Alternatively, the program can be activated by the computer device 202 with the program stored in a memory or a storage of the database 221, the remote computer 222, or the remote computer 223. The remote computer 222 may be a portable information terminal such as a smartphone, a tablet computer, or a laptop computer. In the case of a portable information terminal or the like, communication can be performed using wireless communication.

Accordingly, one embodiment of the present invention can provide a text generation method in which an object is converted into text. Another embodiment of the present invention can provide a text generation method in which an object is converted into graph data and then the graph data is converted into text. Another embodiment of the present invention can provide a text generation system in which an object is converted into text utilizing a computer device. Another embodiment of the present invention can provide a text generation system for converting the contents of a drawing or the like composed of a plurality of objects into text.

Parts of this embodiment can be combined as appropriate for implementation.

REFERENCE NUMERALS

A0: vertex coordinates, A1: vertex coordinates, A2: vertex coordinates, A3: vertex coordinates, A4: vertex coordinates, B0: vertex coordinates, B1: vertex coordinates, B2: vertex coordinates, B3: vertex coordinates, B4: vertex coordinates, B5: vertex coordinates, C0: vertex coordinates, C1: vertex coordinates, C2: vertex coordinates, C3: vertex coordinates, 10: conceptual diagram, 10A: graph data, 10B: text data, 20: area, 20A: text data, 100: text generation system, 110: GUI, 120: image processing unit, 130: feature extraction unit, 140: graph generation unit, 141: graph data, 150: text generation unit, 151: text data, 160: database, 200: computer system, 201: display device, 201A: display region, 202: computer device, 203: input device, 203*a*: cursor, 210: GUI, 211: arithmetic device, 212: memory, 213: input/output interface, 214: communication device, 215: storage, 216: keyboard, 217: network interface, 221: database, 222: remote computer, 223: remote computer, 301*a*: object, 301*b*: object, 302: object, 303: object, 310: object, 400: object, 401: object, 402: object, 404: object, 406*a*: object, 406*b*: object, 406*c*: object, 408: object, 410*a*: object, 410*b*: object, 412: object, 416*a*1: object, 416*a*2: object, 429: object, 430: object, 431: object, 432: object

What is claimed is:

1. A computer comprising a storage storing a program, the program comprising processing procedure configured to:
    display a first object and a second object in a drawing on a display device;
    display graph data formed based on the first object and the second object on the display device;
    generate a text about a positional relation between the first object and the second object from the graph data; and
    display the text on the display device,
    wherein the graph data comprises positional relation data of the first object and the second object, and
    wherein the positional relation data is obtained after removing an overlap region between the first object and the second object.

2. The computer according to claim 1,
    wherein the text comprises any one or more pieces of data that one of the objects is on the left, right, upper, or lower side of the other object, one of the objects is included in the other object, or one of the objects is in contact or not in contact with the other object.

3. The computer according to claim 1,
    further comprising processing procedure configured to generate graph data from the positional relation data relative to the reference object.

4. The computer according to claim 1,
    wherein the drawing is a patent drawing.

5. The computer according to claim 1,
    further comprising processing procedure configured to convert the first object into a vector image,
    wherein the first object is a raster image.

6. The computer according to claim 5,
    further comprising processing procedure configured to convert the first object into a vector image after being converted into the raster image.

* * * * *